United States Patent [19]

Day et al.

[11] Patent Number: 5,022,991

[45] Date of Patent: Jun. 11, 1991

[54] THERMITE COATED FILTER

[75] Inventors: John P. Day, Big Flats; Timothy V. Johnson, Corning, both of N.Y.

[73] Assignee: Corning Incorporated, Corning, N.Y.

[21] Appl. No.: 241,581

[22] Filed: Sep. 8, 1988

[51] Int. Cl.$^5$ .............................................. B01D 39/20
[52] U.S. Cl. ................... 210/506; 210/510.1; 210/773
[58] Field of Search ...................... 210/773, 506, 510.1

[56] References Cited

U.S. PATENT DOCUMENTS

| | | | |
|---|---|---|---|
| 3,288,615 | 11/1966 | Estes et al. | 210/506 |
| 4,258,099 | 3/1981 | Narumiya | 210/506 |
| 4,591,383 | 5/1986 | McGarry et al. | 75/93 R |
| 4,681,624 | 7/1987 | DeAngelis et al. | 75/28 |
| 4,772,395 | 9/1988 | Tungatt et al. | 210/506 |
| 4,834,876 | 5/1989 | Walker | 210/773 |
| 4,885,263 | 12/1989 | Brockmeyer et al. | 210/506 |

OTHER PUBLICATIONS

Webster's Third New International Dictionary, pp. 850 and 2373.
Metals Handbook, 9th Ed., vol. 15, Casting pp. 492–493 and 593–597.
The Unlimiters, Corning Product Brochure.
Metal Filters, Corning Incorporated, Product Brochure.
*Analysis of Casting Defects*, American Foundrymen's Society, 1974, 3rd ed., Committee 80G-2.

Primary Examiner—Ivars Cintins
Attorney, Agent, or Firm—Evan K. Butts; Richard N. Wardell

[57] ABSTRACT

Thermite coatings are applied to molten metal filters and the environs, to produce longer lived filters that can be utilized in harsher environments. The coatings employ exothermic, redox, and combination reactions to produce the beneficial effects.

18 Claims, No Drawings

THERMITE COATED FILTER

BACKGROUND OF THE INVENTION

The present invention relates to thermite coatings applied to molten metal filters. The coatings involve an exothermic reaction, an oxidation-reduction reaction, or a combination thereof which occurs as the metal is filtered. The advantages provided by the use of the thermite coating on the filter are: the reduction of thermal shock to the filter, the avoidance of metal freezing during filtering, improved filtration efficiency, and the protection of the filter against chemical attack. All of these advantages may provide improved filter performance.

In the processing of molten metals, it has been found advantageous to filter the metal in the liquid state. To filter metal as a liquid requires a filter with extraordinary properties. The filter must be able to withstand extreme thermal shock, chemical corrosion, and mechanical stresses. The present molten metal filter art employs ceramic monoliths whose main components are sintered silicon carbide, zirconia, alumina and/or silica with modifiers added as required.

Generally in the working of molten metals, reduced metals are heated to above their melting points and poured into castings either for purposes of storage or for molding into a product. During the pouring operation, prior to the casting, a ceramic filter has been introduced to entrap inclusions out of the molten metal. It has been discovered by those knowledgeable in the molten metal casting art, that excluding certain contaminants from the cast provides solid metals with superior properties at reduced costs.

Certain molten metals, for example super alloys, stainless steels, steel alloys, cast irons, and nonferrous metals, are heated to temperatures which test the very limits of the physical and chemical properties of the ceramic material. That these limits are exceeded is evidenced by catastrophic failure of the filter during the pour. During a catastrophic failure the filter breaks into many pieces. The filter may experience less than catastrophic failure and still be inoperable due to some other failure mechanism. For example, if the mechanical strength of the ceramic material is exceeded, the filter may deform in the direction of flow.

The ceramic material is also subject to chemical corrosion. The molten metal slag may, by way of illustration, attack the silicon oxygen bonds in silica and thereby weaken the structural integrity of the filter. This slag attack or dissolution is a cause of significant failures in filters.

It has been found that many of the inclusions in the molten metals are oxide based impurities which are better filtered by an oxide based ceramic. Filterability can be enhanced by matching the surface energies of the oxide filter to the inclusion to be filtered. Therefore, surface effects are important to consider when choosing the most efficient filter for a particular molten metal.

Finally, some problems in filtering molten metals can be directly associated with the freezing of the molten metal as it contacts the filter. Since the filter is at temperatures significantly less than the molten metal pour temperature, the initial molten metal which contacts the filter must impart heat to the filter. Since the filter draws heat from the metal, that part of the molten metal affected decreases in temperature which may cause the metal to freeze. As the metal solidifies in the filter, the solid metal may block entirely or at least partially the filterability of the ceramic, or it will slow the rate of filtering in the initial stages of the pour, thus decreasing filter performance. This same phenomenon is realized in the several gating or entry means that are positionally placed before the molten metal filter. It has been found advantageous to coat the entry means, such as nozzles, sheathes, pouring cups or basins, sprues, sprue wells, runners, or reservoirs, with thermite coatings to avoid metal freezing prior to contact with the filter. Additionally, it may be found to be advantageous to add the thermite coating to the downstream side or exit means of the filter. A problem in the art is found to exist in molds and runner systems after the filter, since metal freezing may commonly decrease the efficiency of casting.

The invention herein disclosed solves many of the above cited problems associated with the molten metal filter art. It has been found that a thermite coating involving an exothermic reaction, an oxidation-reduction reaction, or a combination thereof on the surface of the filter, whose reaction product remains on the surface of the filter during filtering, provides operable filters which heretofore would fail in the same environment.

SUMMARY OF THE INVENTION

According to the practice of this invention ceramic molten metal filters are coated with reactive chemical species; wherein a first embodiment of said species react due to an initiating heat treatment or heat communication that stimulates an exothermic reaction, or in a second embodiment said species react due to an initiating heat treatment or heat communication that stimulates an oxidation-reduction reaction, or as a third embodiment some combination therebetween or thereof of the two preceding embodiments. When one skilled in the art incorporates an embodiment of this invention providing said coating and the subsequent dynamic of the reaction, the practitioner realizes the benefits of the invention with prolonged longevity and efficiency of the molten metal filter.

The invention discloses a thermite coating on a molten metal filter wherein said coating is comprised of reactants wherein said reactants comprise a negative free energy of reaction, wherein said reactants initiate reaction by catalysis or heat communication with said thermite coating, whereby a product of said reaction provides a protective coating for said filter, provides heat for said filter or a molten metal, or provides resistance to chemical attack, or a combination thereof or therebetween. Additionally, contemplated in this same context is a thermite coating wherein the coating is comprised of an oxidation-reduction reaction or a combination of exothermic reaction and oxidation-reduction reaction.

The advantages of a thermite coating on a molten metal filter will be appreciated by those who practice the molten metal filter art as the invention herein becomes apparent.

The first embodiment of the invention avails itself of the thermodynamic relationship generally found in species which when sufficiently encouraged, either through catalysis or through the addition of an initial energy grant or heat communication to the reactants, completes the reaction to products whereby the process of reaction generates heat and warms its environment. This class of reaction is generally known as an exothermic reaction. Exothermic reactions are known, by those skilled in the art, to have an overall negative free energy of reaction. An example of such a reaction is the interaction between ZrC+VN to give ZrN+VC and heat.

These kinds of reactions can also be characterized by their enthalpies of reaction, a significant property related to the free energy. The individual enthalpies of reactants in a reaction may be a major factor in interactions wherein the net enthalpies available are near or at 0° Kcal/mole at the pour temperature. These reactions may provide valuable benefits to the filter, even though the net enthalpy of the reaction may not be negative. An example of such a reaction is the interaction between $MgO + SiO_2$ to give $MgO.SiO_2$.

The second embodiment of the present invention employs the dynamic of an oxidation-reduction reaction or redox couple reaction. Similar to the first embodiment where no redox couple is required, the redox couple of this embodiment, such as aluminum, titania, and aluminum nitride are mixed to yield titanium nitride and alumina, is applied to the surface of the ceramic filter and/or entry means to the filter as a coating or as a part thereof. Once the coating is applied, in slurry form, the redox reactants are allowed to dry on the surface of the ceramic. The coated filter is then inserted in the molten metal pour path for purposes of filtering. As the molten metal nears or communicates with the coated filter, the heat from the metal provides the initial energy needed to overcome the activation energy of the redox couple or in the alternative the above first embodiment. Once activated the reaction proceeds to completion.

Generally, the preferred redox couple of the inventive dynamic coating releases energy, that is the redox reaction is exothermic. This third variate of the invention is the combination whereby the redox reaction has a negative free energy heat of reaction. The benefits that inure and the mechanism of reaction is analogous to that described above in embodiments one and two. As one skilled in the art may appreciate, an exothermic reaction may capably donate heat to the metal so that the metal does not freeze in the filter. Additionally, an exothermic reaction may donate heat to the filter thereby requiring less heat flow from the metal to bring the filter to molten metal temperatures. This phase of the thermite reaction is known as filter priming.

Upon completion of the filter priming reaction, the thermite coating reaction, whether by the redox or heat of reaction mechanism, the product of the reaction remains as a layer on the ceramic filter. The product may be an oxidized form or simply a more stable compound of the reactants, which may provide chemical durability to the ceramic filter. The durability is manifested as a physical barrier or sacrificial layer on the ceramic filter which provides protection against slag attack. The particular reaction chosen as the coating may depend on the composition of the inclusion to be entrapped, the type of molten metal to be filtered, the filter substrate composition, the exothermic heat of reaction of the coating, the priming temperatures required, the slag chemistry, ladle refractories, or a combination thereof. It is well known to those in the art that physical and chemical compatibilities of the inclusion and filter lead to more efficient filtering. For instance, if alumina inclusions are predominant in the slag, a most efficient surface for filtering is an alumina coating. By matching chemistries, alumina in this instance, the inclusions tend to become highly associated with the filter, thereby becoming filtered from the molten metal.

Advantageously, tailoring the coating to the slag properties provides the freedom to design the filter substrate out of materials that can withstand the temperatures experienced in the molten metal environment. For example, filter substrates high in alumina or silica, such as mullite, can not normally withstand attack by a slag with a high calcia content. The various protective mechanisms provided by the thermite coating on a mullite substrate allow use of the substrate where, heretofore, the same substrate would have experienced catastrophic failure.

In the present invention, it has been found advantageous to select mixtures of mullite and alumina as substrate filter material. When excess alumina is added to a mullite batch composition and fired at approximately 1400° C., it is found to produce a ceramic body comprised of mullite and alumina crystalline phases. These structures can withstand the typical pouring temperatures of molten low carbon steel, in excess of 2800° F. (approximately 1537° C.).

Advantageously, substrate filter material can be made from alumina, mullite, zircon, zirconia, spinel, cordierite, lithium aluminosilicates, titania, feldspars, quartz, fused silica, silicon carbide, kaolin clay, aluminum titanate, silicates, aluminates, and mixtures thereof. Additionally, it is found that porous metal bodies sintered from powders of aluminum, iron, copper, steel, tin, alloys therebetween and mixtures thereof provide advantageous substrate materials.

It has been noted that a small glassy phase may be present in the mullite-alumina ceramic body which may aid the thermal shock properties of the ceramic. The glass, comprising an alkali alumino-silicate composition, may occupy grain body sites between the different phases. The glass relieves thermal stresses caused by rapid heating without disruption of the mullite or alumina crystalline phases.

It is contemplated that any reaction which can be initiated by the molten metal pour will be advantageous as a thermite coating. This includes any of the transition and/or rare earth metal reactants. Generally, the following reaction is obtained:

$$M_xL_z + yR = R_yL_z + xM$$

where x may or may not be equal to y, or x and y may or may not equal z, and L is some anion. Additional oxidized metals may be added to the reactant side of the equation to introduce yet another redox couple for multiple redox reactions.

Potential metal reactants may be derived from lithium, mercury, palladium, silver, copper, lead, cadmium, cobalt, nickel, molybdenum, tin, iron, tungsten, vanadium, potassium, zinc, niobium, and chromium. These metals, designated as M in the above equation, may be present as some oxidized species, such as oxide, carbide, nitride, halide, phosphide, boride, aluminides, silicides, nitrates, sulfates, phosphates, carbonates, or some organic anion, such as oxylates, succinates, and chelates, to react with another metal to produce an exothermic, redox or some combination reaction.

The families of and some representative reactive metals, designated as R in the above equation, contemplated within the present invention comprise: Groups IA, IIA, IIIA, IVA, IIIB, IVB, VB, VIB, VIII, IB and the rare earth metals. More specifically the following metals can be very usefully employed for the purposes of the present invention yttrium, manganese, tantalum, vanadium, silicon, titanium, zirconium, aluminum, uranium, barium, magnesium, berylium, thorium, and calcium.

A most preferred redox couple is $Fe_2O_3$ and Al (as contained in a 50/50 Fe/Al alloy). This reaction provides a suitable priming reaction, generates a durable protective coating and aids in filtering impurities in the melt.

The invention is additionally embodied in a redox and/or exothermic reaction wherein the coating, rather than reacting with a component within the coating, reacts with the filterable molten metal. In this instance, the reactive metal source in the molten metal reacts with the oxidized species in the coating. For example, tin oxide plus iron will oxidize the iron in molten steel. Similarly, dissolved silicon, manganese, and aluminum constituents of steel can reduce other oxides, exothermically, to effect the advantages of the invention. A particular advantage of this embodiment is that refractory metals do not have to be added to the coating, thus decreasing coating slurry instability. Associated disadvantages may be obtained due to loss of compositional control and undesirable by-products.

The invention is also embodied in a reaction of the coating with the substrate. In this particular embodiment, an oxidized reactant is available in the substrate to react with the coating, which includes the metal reductant. Less stable oxides in the filter, such as silica, chromia, and titania, can be reduced by aggressive reductants such as zirconium, and aluminum. Dissolved oxygen, sulfur, and phosphorous, which may be present in the molten metal, are also available to react with the reactive metal.

Combinations of the above species may be engineered to effect the advantageous results of this invention. One skilled in the art could mix a potpourri of reactants to self-react in the coating, react with the molten metal, and react with filter substrate to produce the exothermic, redox, and/or combination reactions resulting in the above cited benefits. Combinations of chemical species therebetween and thereof may be effected with similar results.

It has also been found advantageous to add diluents to the thermite reaction. The addition of diluents may slow the reaction rate of the thermite reactions thus avoiding localized melting of the filter. The diluent may be an inert material that absorbs heat from the exothermic reaction. A larger amount of heat can be extracted if the diluent melts at temperatures less than the adiabatic flame temperature. An additional diluent benefit may be realized if a diluent is chosen that sinters onto the filter during the exothermic reaction. This results in an additional protective barrier. Alumina is the most preferred diluent. Other diluents are titania, chromia and zirconia, all exhibit strong resistance to slag attack.

As will be further illustrated by the examples below, which are not intended as limitations of the invention, the utility and range of thermite coatings expands the current compositional ranges of molten metal filter substrate materials, due to the protection afforded by the thermite coating.

DETAILED DESCRIPTION OF THE INVENTION

The substrate of the molten metal filter is comprised of a mullite-alumina composition. The bulk chemistry of the powder ranges from 72 to 86 weight percent alumina, the remaining balance silica. Various impurities may be present in the raw materials, such as alkaline earths, without serious impact on the resultant body. Upon sintering the crystal phases present are 45-20% by weight alumina, 55-80% by weight mullite, 0-2% cristobalite, and a 0-10% amorphous phase.

A preferred substrate bulk composition consists essentially of 72 to 82 weight percent alumina, the remainder silica. The mixture is processed as disclosed above and sintered at approximately 1400° C. A most preferred substrate bulk composition consists essentially of 75 to 78 weight percent alumina, the remainder silica. The ceramic mixture is then sintered at 1400° C.

The mullite-alumina ceramic body may be conveniently extruded into monoliths with a honeycomb geometry and then sintered. Such a body is then coated with the redox or reaction couple of choice.

EXAMPLE 1

In Example 1, 438 grams of fine pigment grade (99% plus pure) red iron oxide, 316 grams of Alcoa A16SG grade alumina, 446 grams of −325 mesh Fe-Al metal powder (50% Fe), and 147 grams of Dow-Corning 6-2230 silicone resin were mixed in a Littleford mixer for 10 minutes. The mixed powder was next poured into a 1 gallon plastic wide-mouthed container that was one quarter to one third filled with alumina grinding media. The grinding media ranged in size from one quarter to one inch (6.35 to 25.4 mm) in diameter. 1320 grams of isopropyl alcohol was added to the container. The container was then rolled at about 90 rpms for no less than 30 minutes to form a slurry. The slurry was next placed in a bath where the sintered filter was then immersed in the slurry. The filter was then submerged in the bath for approximately 15 seconds with no agitation. The filter was retrieved from the slurry bath and manipulated to insure that the filter cell openings, such as those found in a honeycomb, remained open. The wet coat on the filter was forced air dried in an oven at no more than 200° C. until the filter was dry. This drying process took about 15 minutes.

This general procedure was used to coat all Examples herein disclosed. Those skilled in the art can readily appreciate that modifications of the coating procedure, such as spray coating or pressure feeding, may be made giving equivalent results. Those results are a uniform coating on the filter.

The coatings on Examples 2 through 10 were applied by the same procedure. Example 2 coating was comprised of 100% −100 mesh reagent grade tin oxide. Example 3 was comprised of 100% −200 mesh reagent grade copper II oxide. Example 4 was comprised of 100% −200 mesh Al powder. Example 5 was comprised of 100% −325 mesh Fe/Al powder (50/50). These Examples reacted with the molten metal to produce the exothermic reaction and provide the beneficial properties of the coating.

Example 6 was comprised of 50.4% by weight −325 mesh Fe/Al powder (50/50) and 49.6% by weight fine pigment grade red iron oxide. Example 7 was comprised of 40.4% by weight −325 mesh Fe/Al powder (50/50) and 59.6% by weight −200 mesh reagent grade copper II oxide. Example 8 was comprised of by weight 37.2% −325 mesh Fe/Al powder (50/50), 36.5% fine pigment grade red iron oxide, and 26.3% −270 mesh Combustion Engineering, Minerals chrome ore (about 45% iron oxide, the balance chromia). Example 9 was comprised of by weight 55.3% Alcoa A16SG grade alumina, 37.1% pigment grade red iron oxide, and 7.6% −200 mesh aluminum diboride. Example 10 was comprised of by weight 50.4% −200 mesh Cr/Al powder and 49.6% pigment grade red iron oxide.

All of the filters coated with the above thermite coatings survived catastrophic failure or inoperability experienced by the same uncoated molten metal filters. Some of the coatings performed better dependent upon the kind of metal filtered. The metal filtered determined whether the coating was subjected to an acidic, basic, or neutral slag. The preferred coating was iron oxide, alumina, and Fe/Al alloy. The most preferred coating was iron oxide, chromia, and Fe/Al.

The table presents the results of the various thermite coatings applied to a ceramic substrate. Qualitative comments accompany each result detailing the phenomena observed.

| Example | Temperature | Results |
|---|---|---|
| 1 | 2980° F. | undispersed, undiluted coating successful; dispersed, undiluted coating unsuccessful; dispersed diluted coating successful; good mixing of undiluted coating gave too much heat, diluent helps regulate. |
| 1 | 3110° F. | coatings failed due to pin hole defects. |
| 1 | 2833° F. | ¾" 100 csi filter w/ 15 wt. % coating primed at 45° F. superheat in vertical orientation; same filter w/ 7 wt. % coating did not prime at same superheat; estimate that 180° F. superheat needed for uncoated filter. |
| 1 | 2910° F. | coated filter resisted attack better than uncoated for all slag types tested (2 basic, 1 acid). |
| 2 | 2960° F. | filter broke into three large pieces (non-catastrophic), and may have failed due to slag plugging causing excessive stress on substrate; previously same uncoated filter failed catastrophically; failure mechanism shows positive shift, and SnO2 coating has high chance of succeeding. |
| 3 | 2960° F. | similar results as in example 2 pour; non-catastrophic failure. |
| 4 | 2970° F. | shift from catastrophic to non-catastrophic failure (only 10% of filter gone); varies from results using no coating, or Fe/Al 50/50 coating; (see example 5). |
| 5 | 2974° F. | catastrophic failure (filter diced). |
| 6 | 2930–2995° F. | uncoated filter failed catastrophically (>15 tests), coated filter didn't break (7 tests). |
| 6 | 2870° F. 2860° F. | uncoated filter deformed at 2870° F.; coated filter OK at 2860° F.; coated filter trapped more inclusions than uncoated filter. |
| 6 | 2920° F. 2930° F. | uncoated filter deformed at 2920° F.; coated filter OK at 2930° F.; casting made using coated filter was cleaner. |
| 7 | 2960° F. | same as examples 3 & 4, but no loss of filter; (uncoated previous failure catastrophically) see example 6 |
| 8 | 2980° F. | filter passed; uncoated filter failed catastrophically (see example 6). |
| 8 | 2910° F. | coated filter resisted attack by acid and basic slags significantly better than uncoated filter. |
| 9 | 2960° F. | same as examples 3 & 4. |
| 9 | 2910° F. | similar results as in example 8; ex. 8 coating slightly more resistant to basic slag attack. |
| 10 | 2910° F. | similar results as in example 8; equivalent resistance. |

We claim:

1. A molten metal filter comprising a substrate having a thermite coating thereon, said coating comprises reactants which will undergo reaction that has a negative free energy of reaction and is initiated by catalysis or heat communication with said thermite coating.

2. A molten metal filter comprising a substrate having a thermite coating thereon, said coating comprises inorganic oxidation-reduction reactants which will undergo reaction initiated by catalysis or heat communication with said thermite coating.

3. A molten metal filter comprising a substrate having a thermite coating thereon, said coating comprises inorganic oxidation-reduction reactants which will undergo reaction that has a negative free energy of reaction and is initiated by catalysis or heat communication with said thermite coating.

4. The filter of claim 1, 2, or 3 wherein said coating will react within itself, with the substrate, with the molten metal, or with a combination thereof.

5. The filter of claim 1, 2, or 3 wherein one of said reactants includes metal selected from the group consisting of lithium, mercury, palladium, silver, copper, lead, cadmium, cobalt, nickel, molybdenum, tin, iron, tungsten, vanadium, potassium, zinc, niobium, chromium, and a combination thereof.

6. The filter of claim 5 wherein the one of said reactants is combined with anion or compound species selected from the group consisting of oxide, boride, carbide, nitride, halide, phosphide, aluminide, silicide, nitrate, sulfate, phosphate, carbonate, organic anion, or a combination thereof.

7. The filter of claim 1, 2, or 3 wherein the reactants of said coating consist essentially of iron oxide and aluminum.

8. A filter of claim 1, 2, or 3 wherein said substrate is ceramic material selected from the group consisting of alumina, mullite, zircon, zirconia, spinel, cordierite, lithium aluminosilicate, titania, feldspar, quartz, fused silica, silicon carbide, kaolin clay, aluminum titanate, silicate, aluminate, and mixture thereof.

9. A filter of claim 1, 2, or 3 wherein said substrate comprises sintered metal powder selected from the group consisting of aluminum, iron, copper, steel, tin, and alloys therebetween and mixtures thereof.

10. Apparatus comprising the filter of claim 1, 2, or 3 and any entry means to the molten metal filter, which entry means is coated with said thermite coating.

11. Apparatus of claim 10 wherein said entry means is selected from the group consisting of nozzles, sheaths, pouring cups or basins, sprues, sprue wells, runners, reservoirs, and a combination thereof.

12. The filter of claim 1, 2, or 3 wherein the reactants of said coating consist essentially of chromia, iron oxide, and aluminum.

13. The filter of claim 1, 2, or 3 wherein the coating includes a diluent selected from the group consisting of alumina, chromia, titania, zirconia, and a combination thereof.

14. Apparatus comprising the filter of claim 1, 2, or 3 and an exit means from the molten metal filter, which exit means is coated with said thermite coating.

15. The filter of claim 1, 2, or 3 wherein one of said reactants is metal selected from Groups IA, IIA, IIIA, IVA, IIIB including the rare earth metals, IVB, VB, VIB, VIII, and IB, or a combination thereof.

16. The filter of claim 15 wherein said metal is selected from the group consisting of yttrium, manganese, tantalum, vanadium, silicon, titanium, zirconium, aluminum, uranium, barium, magnesium, berylium, thorium, calcium, rare earth metal, or a combination thereof.

17. The filter of claim 1, 2, or 3 wherein the reactants of said coating consist essentially of iron oxide and aluminum combined with metal selected from iron and chromium.

18. The filter of claim 1, 2, or 3 wherein the reactants of said coating consist essentially of chromia, iron oxide, and aluminum combined with iron.

* * * * *

UNITED STATES PATENT AND TRADEMARK OFFICE
CERTIFICATE OF CORRECTION

PATENT NO. : 5,022,991

DATED : June 11, 1991

INVENTOR(S) : John P. Day and Timothy V. Johnson

It is certified that error appears in the above-identified patent and that said Letters Patent is hereby corrected as shown below:

Column 8, line 57, Claim 10, -- any --
should read -- an --.

Signed and Sealed this

Second Day of February, 1993

Attest:

STEPHEN G. KUNIN

*Attesting Officer*     *Acting Commissioner of Patents and Trademarks*